(12) United States Patent
Jo (10) Patent No.: US 12,167,164 B2
(45) Date of Patent: Dec. 10, 2024

(54) APPARATUS, METHOD, AND COMPUTER-READABLE STORAGE MEDIUM FOR RECORDING VIDEO IN VEHICLE PARKED IN N-STATE PARKING MODE

(71) Applicants: Hyundai Motor Company, Seoul (KR); Kia Corporation, Seoul (KR)

(72) Inventor: Dong Cheol Jo, Cheonan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 118 days.

(21) Appl. No.: 18/066,033

(22) Filed: Dec. 14, 2022

(65) Prior Publication Data

US 2024/0040078 A1    Feb. 1, 2024

(30) Foreign Application Priority Data

Jul. 26, 2022    (KR) ........................ 10-2022-0092348

(51) Int. Cl.
| | |
|---|---|
| *H04N 5/77* | (2006.01) |
| *B60C 23/04* | (2006.01) |
| *G01S 13/60* | (2006.01) |
| *H04N 7/18* | (2006.01) |

(52) U.S. Cl.
CPC ........... *H04N 5/77* (2013.01); *B60C 23/0408* (2013.01); *H04N 7/183* (2013.01); *G01S 13/60* (2013.01)

(58) Field of Classification Search
CPC .......... H04N 5/77; H04N 7/183; H04N 7/188; B60C 23/0408; B60C 23/0477; G01S 13/60; G01S 2013/9314; G01S 13/867; G01S 13/931; G07C 5/008; G07C 5/0866; G07C 5/0808; B60R 21/013; B60R 21/01534; B60R 2021/0027
See application file for complete search history.

(56) References Cited

U.S. PATENT DOCUMENTS

| | | | |
|---|---|---|---|
| 2010/0049401 A1* | 2/2010 | Watanabe ................. | B60R 1/23 701/41 |
| 2018/0244152 A1* | 8/2018 | Lee ......................... | B60R 25/06 |
| 2019/0279440 A1* | 9/2019 | Ricci ....................... | G06Q 10/20 |

(Continued)

FOREIGN PATENT DOCUMENTS

| | | | |
|---|---|---|---|
| CN | 108040333 A | * | 5/2018 |
| JP | 2008310765 A | | 12/2008 |
| KR | 20210083839 A | | 7/2021 |

OTHER PUBLICATIONS

CN-108040333-A English translation (Year: 2018).*

*Primary Examiner* — Fernando Alcon
(74) *Attorney, Agent, or Firm* — Slater Matsil, LLP (57) ABSTRACT

An embodiment apparatus for recording a video in a parked vehicle includes an impact detection module configured to detect an impact applied to the parked vehicle parked in a neutral state (N-state) parking mode, wherein, in the N-state parking mode, an engine is in an ignition-off state and a gear shift lever is in a neutral state, a control module configured to determine, based on an air pressure of a tire or a wavelength of a radar reception signal, whether the parked vehicle is moving, in response to detection of the impact, and a camera module configured to record a video of surroundings of the parked vehicle, in response to a determination that the parked vehicle is moving.

20 Claims, 5 Drawing Sheets

(56) References Cited

U.S. PATENT DOCUMENTS

| | | | | |
|---|---|---|---|---|
| 2020/0031180 A1* | 1/2020 | Usami | ............... | B60C 23/0401 |
| 2020/0141160 A1* | 5/2020 | Kotha | .................. | E05B 81/74 |
| 2020/0369240 A1* | 11/2020 | Kern | ..................... | B60R 25/32 |
| 2022/0141384 A1* | 5/2022 | Poirier | ............... | H04N 23/698 |
| | | | | 348/36 |
| 2022/0141426 A1* | 5/2022 | Kim | ..................... | H04N 7/183 |
| | | | | 348/148 |
| 2022/0187441 A1* | 6/2022 | Bialer | ................. | G01S 13/62 |
| 2022/0410890 A1* | 12/2022 | Takei | ................. | B60W 30/143 |
| 2023/0093041 A1* | 3/2023 | Hagen | .................. | H04W 4/40 |
| | | | | 340/436 |
| 2023/0102884 A1* | 3/2023 | Hockin | .................. | G01P 1/07 |
| | | | | 713/2 |
| 2023/0260289 A1* | 8/2023 | Tabata | ................ | H04N 7/181 |
| | | | | 348/148 |
| 2023/0386268 A1* | 11/2023 | Scarbrough | ............ | H04N 7/188 |

\* cited by examiner

APPARATUS, METHOD, AND COMPUTER-READABLE STORAGE MEDIUM FOR RECORDING VIDEO IN VEHICLE PARKED IN N-STATE PARKING MODE

CROSS-REFERENCE TO RELATED APPLICATIONS

This application claims the benefit of Korean Patent Application No. 10-2022-0092348, filed on Jul. 26, 2022, which application is hereby incorporated herein by reference.

TECHNICAL FIELD

The present disclosure relates to an apparatus, a method, and a computer-readable storage medium for recording a video in a vehicle parked in a neutral state (N-state) parking mode.

BACKGROUND

Recently in Korea, N-state parking has become commonplace due to a lack of parking spaces. As an outside person pushes and moves a vehicle parked in N-state parking mode with external force, many accidents have occurred due to collisions thereof with adjacent vehicles.

Therefore, it is necessary to prepare for an accident occurring during parking by recording a video of surroundings of the vehicle while the vehicle parked in the N-state parking mode is moved by external force.

SUMMARY

Embodiments of the present disclosure provide an apparatus and method for recording a video in a vehicle parked in N-state parking mode, the apparatus and method capable of preparing for accidents that may occur during N-state parking and more accurately determining whether the vehicle is moved.

According to an embodiment of the present disclosure, there is provided an apparatus for recording a video in a vehicle parked in an N-state parking mode, the apparatus including an impact detection module configured to detect an impact applied to the vehicle, a control module configured to determine, based on at least one of an air pressure of a tire and a wavelength of a radar reception signal, whether the parked vehicle is moving, when the impact is detected, and a camera module configured to record a video of surroundings of the vehicle, when it is determined that the parked vehicle is moving. In the N-state parking mode, an engine may be in an ignition-off state and a gear shift lever may be in a neutral state.

According to another embodiment of the present disclosure, there is provided a method for recording a video in a vehicle parked in an N-state parking mode, the method including a first operation of detecting an impact applied to the vehicle, a second operation of determining, based on at least one of an air pressure of a tire and a wavelength of a radar reception signal, whether the parked vehicle is moving, when the impact is detected, and a third operation of recording a video of surroundings of the vehicle, when it is determined that the parked vehicle is moving. In the N-state parking mode, an engine may be in an ignition-off state and a gear shift lever may be in a neutral state.

According to another embodiment of the present disclosure, there is provided a non-transitory computer-readable storage medium recording a program for causing a computer to execute a method.

According to example embodiments of the present disclosure, a video of surroundings of a vehicle may be recorded while the vehicle parked in an N-state parking mode is moved by external force, thereby preparing for an accident that may occur during parking.

In addition, according to example embodiments of the present disclosure, a radar reception signal received from a radar module for detecting an inside passenger may be additionally used in addition to air pressure of a tire when determining whether a vehicle parked in an N-state parking mode is moved by external force, thereby more accurately determining whether the vehicle is moved.

BRIEF DESCRIPTION OF THE DRAWINGS

The above and other aspects, features, and advantages of embodiments of the present disclosure will be more clearly understood from the following detailed description, taken in conjunction with the accompanying drawings, in which.

DETAILED DESCRIPTION OF ILLUSTRATIVE EMBODIMENTS

Hereinafter, example embodiments of the present disclosure will be described with reference to the accompanying drawings. Example embodiments of the present disclosure may, however, be modified to have many different forms and should not be construed as being limited to the specific example embodiments set forth herein. The shapes and sizes of the elements in the drawings may be exaggerated for clarity of description, and the elements denoted by the same reference numerals in the drawings may be the same elements.

Figure 1:
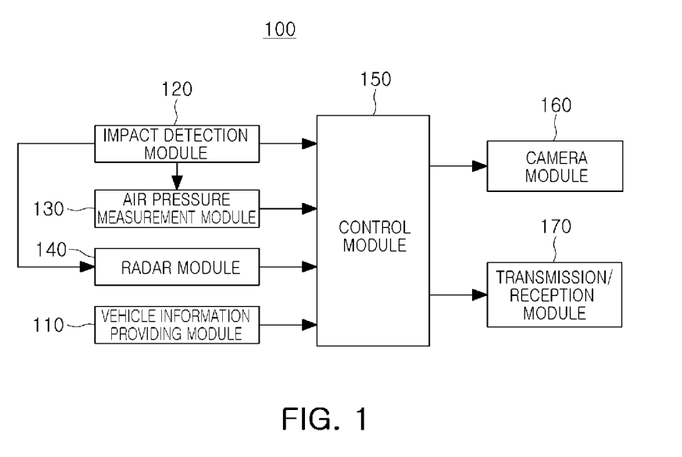
FIG. 1 is a block diagram of an apparatus for recording a video in a vehicle parked in an N-state parking mode according to an example embodiment of the present disclosure.

FIG. 1 is a block diagram of an apparatus for recording a video in a vehicle parked in an N-state parking mode according to an example embodiment of the present disclosure.

First, as illustrated in FIG. 1, a video recording apparatus 100 may include a vehicle information providing module 110, an impact detection module 120, an air pressure measurement module 130, a radar module 140, a control module 150, a camera module 160, and a transmission/reception module 170.

Specifically, the vehicle information providing module 11o may provide, to the control module 150, a vehicle state including an engine ignition state, gear shift lever information, or the like. The control module 150 to be described below may determine, based on the vehicle state, whether a vehicle is parked in an N-state parking mode.

The impact detection module 120 may be a module for detecting an impact applied to the vehicle.

That is, the impact detection module 120 may detect an amount of impact at a point in time at which an outside person pushes the vehicle parked in the N-state parking mode, and may detect that impact is applied to the vehicle when the detected amount of impact is greater than or equal to a preset value. A result of the detection may be transmitted to the control module 150.

Here, the preset value may be appropriately selected according to the needs of those skilled in the art, and the amount of impact may be, for example, an acceleration value, but may be replaced with a vibration value.

In addition, according to an example embodiment of the present disclosure, the impact detection module 120 may transmit a wake-up signal to the air pressure measurement module 130 and the radar module 140, when the impact is detected.

The air pressure measurement module 130 may be a module for measuring an air pressure of a tire.

According to an example embodiment of the present disclosure, when the wake-up signal is received from the impact detection module 120, the air pressure measurement module 130 may periodically measure the air pressure of the tire, and may periodically transmit, to the control module 150, an amount of change in the air pressure based on the measured air pressure of the tire.

Alternatively, according to another example embodiment of the present disclosure, when the wake-up signal is received from the impact detection module 120, the air pressure measurement module 130 may periodically measure the pressure of the tire. When the amount of change in the air pressure based on the measured air pressure of the tire is greater than or equal to a preset first reference value, the air pressure measurement module 130 may periodically transmit a first movement flag to the control module 150.

It should be noted that the first reference value may be appropriately set according to the needs of those skilled in the art, and embodiments of the present disclosure are not limited to specific numerical values.

In addition, the amount of change in the air pressure may refer to an absolute value of a difference between an air pressure of the tire measured in a previous cycle and an air pressure of the tire measured in a next cycle.

When an outside person pushes and moves the vehicle, the amount of change in the tire pressure may have a smaller value, as compared to a vehicle travelling at a predetermined speed or more. The air pressure measurement module 130 may also need to have an appropriate resolution so as to measure the amount of change in the air pressure having a smaller value.

The radar module 140 may be a module for detecting a passenger in the vehicle.

According to an example embodiment of the present disclosure, when the wake-up signal is received from the impact detection module 120, the radar module 140 may periodically transmit a radar transmission signal to the inside of the vehicle, and then may periodically transmit, to the control module 150, an amount of change in a wavelength of the radar reception signal reflected and received from the inside of the vehicle.

Here, the amount of change in the wavelength of the tire may refer to an absolute value of a difference between a wavelength measured in a previous cycle and a wavelength measured in a next cycle.

Alternatively, according to another example embodiment of the present disclosure, when the wake-up signal is received from the impact detection module 120, the radar module 140 may periodically transmit the radar transmission signal to the inside of the vehicle, and then may periodically transmit a second movement flag to the control module 150, when the amount of change in the wavelength of the radar reception signal reflected and received from the inside of the vehicle is greater than or equal to a preset second reference value.

It should be noted that the second reference value may be appropriately set according to the needs of those skilled in the art, and embodiments of the present disclosure are not limited to specific values.

According to an example embodiment of the present disclosure, the air pressure of the tire and the wavelength of the radar reception signal may be values that are changed by shaking of the vehicle when the parked vehicle is moved forward or rearward by external force.

The control module 150 may determine, based on the vehicle state provided by the vehicle information providing module 11o, whether the vehicle is parked in the N-state parking mode. Here, the vehicle state may include an engine ignition state, gear shift lever information, or the like, and the N-state parking mode may refer to that an engine is in an ignition-off state and the shift stage is in the N-state, that is, a neutral state.

In addition, when the impact is detected according to the detection result of the impact detection module 120, the control module 150 may determine, based on at least one of the air pressure of the tire and the wavelength of the radar reception signal, whether the parked vehicle is moving.

Thereafter, when it is determined that the vehicle is moving, the control module 150 may control the camera module 16o to be described below to record a video of surroundings of the vehicle.

According to an example embodiment of the present disclosure, the control module 150 may determine that the vehicle is moving in at least one case among a case in which the amount of change in the air pressure of the tire received from the air pressure measurement module 130 is greater than or equal to a preset first reference value, and a case in which the amount of change in the wavelength of the radar signal received from the radar module 140 is greater than or equal to a preset second reference value.

Alternatively, according to another example embodiment of the present disclosure, when at least one of the first movement flag and the second movement flag is received, the control module 150 may determine that the vehicle is moving.

That is, it should be noted that the control module 150 may determine, based on one of the amount of change in the air pressure of the tire or the amount of change in the wavelength, whether the vehicle is moving, and may more accurately determine whether the vehicle is moving when both the amount of change in the air pressure of the tire and the amount of change in the wavelength are considered.

In addition, according to an example embodiment of the present disclosure, the control module 150 may determine that the vehicle is stopped in at least one case among a case in which the amount of change in the air pressure of the tire received from the air pressure measurement module 130 is less than the preset first reference value for a predetermined period of time (for example, several seconds), and a case in which the amount of change in the wavelength of the radar reception signal received from the radar module 140 is less than the preset second reference value for a predetermined period of time (for example, several seconds). Such a case may be applied to the example embodiment of FIG. 3 to be described below.

Alternatively, according to another example embodiment of the present disclosure, the control module 150 may determine that the vehicle is stopped in a case in which at least one of the first movement flag and the second movement flag is not received for a predetermined period of time (for example, several seconds). Such a case may be applied to the example embodiment of FIG. 4 to be described below.

When it is determined that the parked vehicle is moving, the camera module 160 may record a video of surroundings of the vehicle under the control of the control module 150. The video of the surroundings of the vehicle may include at least one of a front-view video, a rear-view video, and a side-view video of the vehicle. The recorded video of the surroundings of the vehicle may then be transmitted to an external server or a user terminal through the transmission/reception module 170.

It should be noted that the camera module 160 may include a built-in camera provided in the vehicle, but the camera module 160 is not limited to the built-in camera as long as it is capable of recording the video of the surroundings of the vehicle.

Finally, the transmission/reception module 170 may transmit, to the external server or the user terminal, at least one of the video of the surroundings of the vehicle recorded by the camera module 160 and a warning alarm under the control of the control module 150.

As described above, according to an example embodiment of the present disclosure, the video of the surroundings of the vehicle may be recorded while the vehicle parked in the N-state parking mode is moved by external force, thereby preparing for an accident that may occur during parking.

In addition, according to an example embodiment of the present disclosure, a radar reception signal received from a radar module for detecting an inside passenger may be additionally used in addition to the air pressure of the tire when determining whether the vehicle parked in the N-state parking mode is moved by external force, thereby more accurately determining whether the vehicle is moved.

Figure 2:
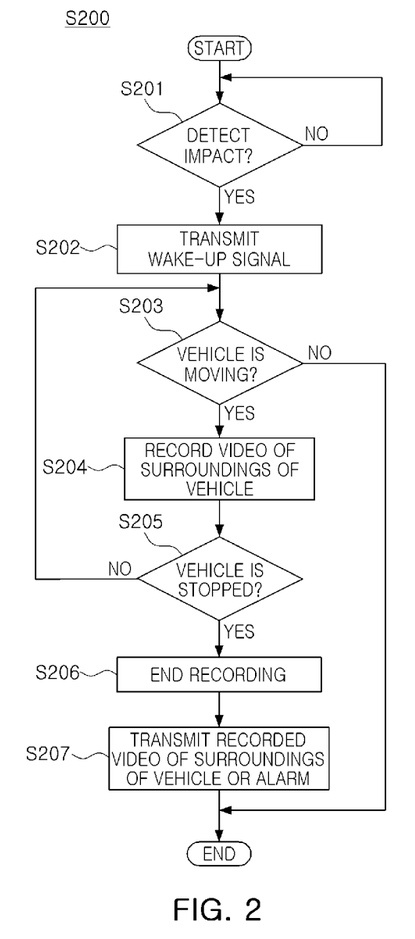
FIG. 2 is a flowchart illustrating a method for recording a video in a vehicle parked in an N-state parking mode according to an example embodiment of the present disclosure.
Figure 3:
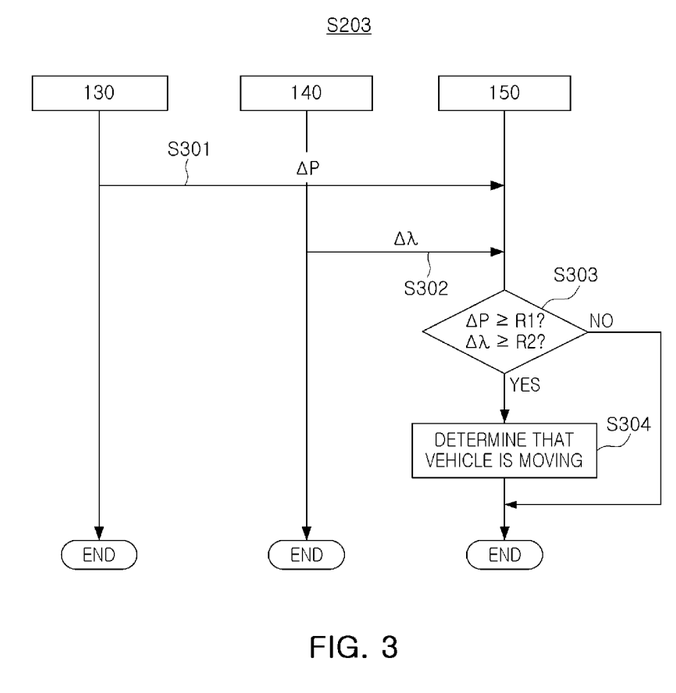
FIG. 3 is a flowchart specifically illustrating operation S203 illustrated in FIG. 2 according to an example embodiment of the present disclosure.
Figure 4:
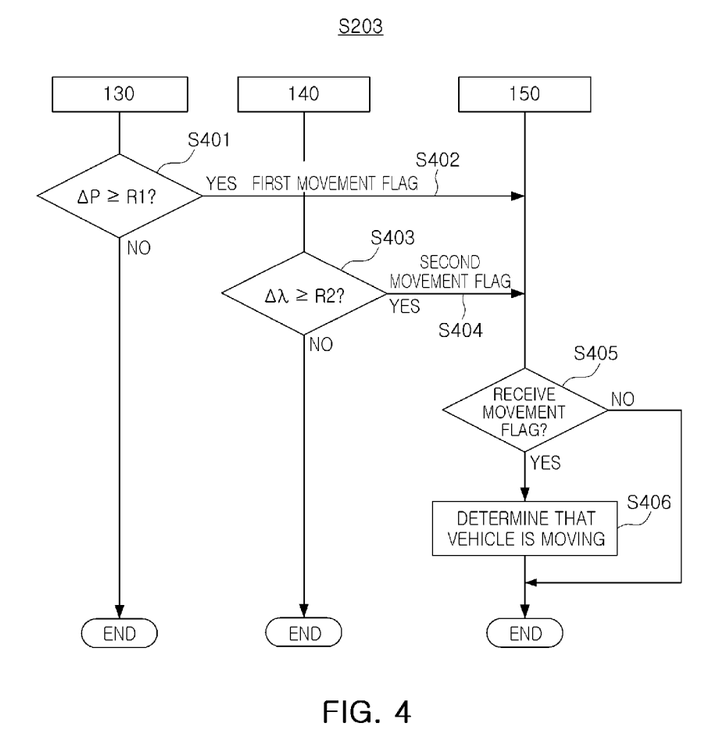
FIG. 4 is a flowchart specifically illustrating operation S203 illustrated in FIG. 2 according to another example embodiment of the present disclosure.

FIG. 2 is a flowchart illustrating a method for recording a video in a vehicle parked in an N-state parking mode according to an example embodiment of the present disclosure. FIG. 3 is a flowchart specifically illustrating operation S203 illustrated in FIG. 2 according to an example embodiment of the present disclosure. FIG. 4 is a flowchart specifically illustrating operation S203 illustrated in FIG. 2 according to another example embodiment of the present disclosure.

Hereinafter, a method for recording a video in a vehicle parked in an N-state parking mode according to an example embodiment of the present disclosure (S200) will be described with reference to FIGS. 1 to 4. However, descriptions overlapping those of FIG. 1 will be omitted for conciseness of the disclosure.

In embodiments of the present disclosure, a vehicle is a vehicle parked in an N-state parking mode, and the N-state parking mode refers to a state in which an engine is in an ignition-off state and a gear shift lever is in an N state, that is, a neutral state.

First, as illustrated in FIGS. 1 and 2, the method (S200) may be started by detecting, by the impact detection module 120, an impact (S201).

That is, the impact detection module 120 may detect an amount of impact at a point in time at which an outsider pushes the vehicle parked in the N-state parking mode, and may detect that an impact is applied to the vehicle when the detected amount of impact is greater than or equal to a preset value. A result of the detection may be transmitted to the control module 150. Here, the preset value may be appropriately selected according to the needs of those skilled in the art, and the amount of impact may be, for example, an acceleration value, but may be replaced with a vibration value, as described above.

Then, the impact detection module 120 may transmit a wake-up signal to the air pressure measurement module 130 and the radar module 140, when the impact is detected (S202).

Thereafter, the control module 150 may determine, based on at least one of an air pressure of a tire and a wavelength of a radar reception signal, whether the parked vehicle is moving (S203).

Such an operation will be described with reference to FIGS. 3 and 4.

First, referring to FIG. 3, when the wake-up signal is received from the impact detection module 120, the air pressure measurement module 130 may periodically measure the air pressure of the tire, and may periodically transmit, to the control module 150, an amount of change in the air pressure $\Delta P$ based on the measured air pressure of the tire (S301).

Similarly, when the wake-up signal is received from the impact detection module 120, the radar module 140 may periodically transmit a radar transmission signal to the inside of the vehicle, and then may periodically transmit, to the control module 15o, an amount of change in the wavelength $\Delta\lambda$ of the radar signal reflected and received from the inside of the vehicle (S302).

Thereafter, the control module 150 may determine whether the amount of change in the air pressure $\Delta P$ of the tire received from the air pressure measurement module 130 is greater than or equal to a preset first reference value R1, and whether the amount of change in the wavelength $\Delta\lambda$ of the radar reception signal received from the radar module 140 is greater than or equal to a preset second reference value R2 (S303).

It should be noted that the first and second reference values may be appropriately set according to the needs of those skilled in the art, and embodiments of the present disclosure are not limited to specific numerical values.

In addition, as described above, the amount of change in the air pressure $\Delta P$ may refer to an absolute value of a difference between an air pressure of the tire measured in a previous cycle and an air pressure of the tire measured in a next cycle, and the amount of change in the wavelength $\Delta\lambda$ may refer to an absolute value of a difference between a wavelength measured in a previous cycle and a wavelength measured in a next cycle.

As a result of the determination, the control module 150 may determine that the vehicle is moving in at least one case among a case in which the amount of change in the air pressure $\Delta P$ of the tire received from the air pressure measurement module 130 is greater than or equal to the preset first reference value R1, and a case in which the amount of change in the wavelength $\Delta\lambda$ of the radar reception signal received from the radar module 140 is greater than or equal to the preset second reference value R2 (S304).

That is, as described above, the control module 150 may determine, based on one of the amount of change in the air pressure of the tire or the amount of change in the wavelength, whether the vehicle is moving, and may more accurately determine whether the vehicle is moving when both the amount of change in the air pressure of the tire and the amount of change in the wavelength are considered.

As another example embodiment, referring to FIG. 4, when the wake-up signal is received from the impact detection module 120, the air pressure measurement module 130 may periodically measure the air pressure of the tire, and may determine whether the amount of change in the air pressure ΔP based on the measured air pressure of the tire is greater than or equal to the preset first reference value R1 (S401).

As a result of the determination, when the amount of change in the air pressure ΔP is greater than or equal to the preset first reference value R1, the air pressure measurement module 130 may periodically transmit a first movement flag to the control module 150 (S402).

When the wake-up signal is received from the impact detection module 120, the radar module 140 may periodically transmit the radar transmission signal to the inside of the vehicle, and then may determine whether the amount of change in the wavelength Δλ of the radar signal reflected and received from the inside of the vehicle is greater than or equal to the preset second reference value R2 (S403).

As a result of the determination, when the amount of change in the wavelength Δλ is greater than or equal to the preset second reference value R2, the radar module 140 may periodically transmit a second movement flag to the control module 150 (S404).

Thereafter, the control module 150 may determine whether at least one of the first movement flag and the second movement flag is received (S405).

As a result of the determination, when at least one of the first movement flag and the second movement flag is received, the control module 150 may determine that the vehicle is moving (S4o6).

That is, as described above, the control module 150 may determine, based on one of the amount of change in the air pressure of the tire or the amount of change in the wavelength, whether the vehicle is moving, and may more accurately determine whether the vehicle is moving when both the amount of change in the air pressure of the tire and the amount of change in the wavelength are considered.

According to an example embodiment of the present disclosure, as described above, the air pressure of the tire and the wavelength of the radar reception signal may be values that are changed by shaking of the vehicle when the parked vehicle is moved forward or rearward by external force.

Referring back to FIG. 2, when it is determined that the vehicle is moving, the camera module 16o may record a video of surroundings of the vehicle (S204).

Thereafter, the control module 150 may determine whether the vehicle is stopped (S205). As a result of the determination, operation S203 may be performed when the vehicle is still moving, and operation S206 may be performed when the vehicle is stopped. Whether the vehicle is stopped may be determined as follows.

That is, according to an example embodiment of the present disclosure, the control module 150 may determine that the vehicle is stopped in at least one case among a case in which the amount of change in the air pressure of the tire received from the air pressure measurement module 130 is less than the preset first reference value for a predetermined period of time (for example, several seconds), and a case in which the amount of change in the wavelength of the radar reception signal received from the radar module 140 is less than the preset second reference value for a predetermined period of time (for example, several seconds). Such a case may be applied to the example embodiment of FIG. 3 described above.

Alternatively, according to another example embodiment of the present disclosure, the control module 150 may determine that the vehicle is stopped in a case in which at least one of the first movement flag and the second movement flag is not received for a predetermined period of time (for example, several seconds). Such a case may be applied to the example embodiment of FIG. 4 described above.

When it is determined that the vehicle is stopped, the camera module 160 may end recording of the video of the surroundings of the vehicle (S2o6).

Thereafter, the transmission/reception module 170 may transmit, to an external server or a user terminal, at least one of the recorded video of the surroundings of the vehicle and a warning alarm (S207).

As described above, according to an example embodiment of the present disclosure, the video of the surroundings of the vehicle may be recorded while the vehicle parked in the N-state parking mode is moved by external force, thereby preparing for an accident that may occur during parking.

In addition, according to an example embodiment of the present disclosure, a radar reception signal received from a radar module for detecting an inside passenger may be additionally used in addition to the air pressure of the tire when determining whether the vehicle parked in the N-state parking mode is moved by external force, thereby more accurately determining whether the vehicle is moved.

Figure 5:
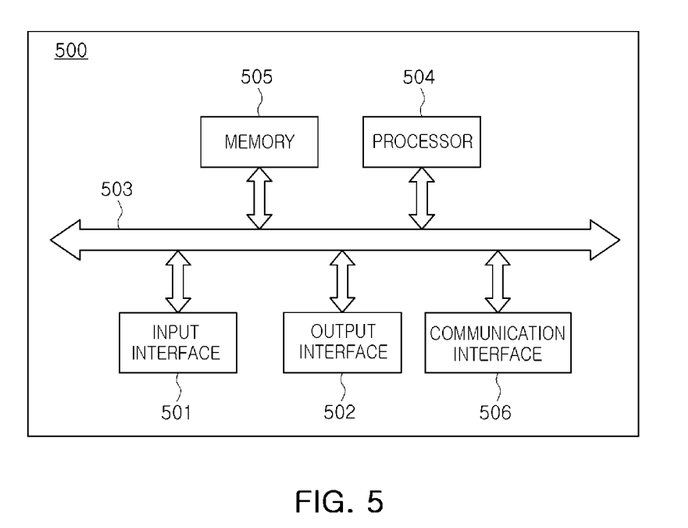
FIG. 5 is a block diagram of a computer device capable of fully or partially implementing an apparatus for recording a video in a vehicle parked in an N-state parking mode according to an example embodiment of the present disclosure.

FIG. 5 is a block diagram of a computer device capable of fully or partially implementing an apparatus for recording a video in a vehicle parked in an N-state parking mode according to an example embodiment of the present disclosure, and may be applied to the control module 150 illustrated in FIG. 1.

As illustrated in FIG. 5, the computer device 500 may include an input interface 501, an output interface 502, a processor 504, a memory 505, and a communication interface 506. The input interface 501, the output interface 502, the processor 504, the memory 505, and the communication interface 506 may be interconnected via a system bus 503.

In example embodiments of the present disclosure, the memory 505 may be used to store a program, instruction or code, and the processor 504 may execute the program, instruction or code stored in the memory 505, may control the input interface 501 to receive a signal, and may control the output interface 502 to transmit a signal. The memory 505 may include read-only memory and random access memory, and may provide an instruction and data to the processor 504.

In example embodiments of the present disclosure, it should be understood that the processor 504 may be a central processing unit (CPU), and may be other general-purpose processors or digital signal processors (DSPs), an application specific integrated circuit (ASIC), a field programmable gate array (FPGA), or other programmable logic devices, discrete gate or transistor logic devices, discrete hardware components, and the like. The general-purpose processor may be a microprocessor, or the processor may also be any conventional processor or the like.

In an implementation process, the method performed in each of apparatuses of FIGS. 2 to 4 may be achieved by an integrated logic circuit of hardware in the processor 504 or an instruction in the form of software. The contents of the methods disclosed in connection with embodiments of the present disclosure may be implemented to be performed and completed by a hardware processor, or may be performed and completed by a combination of hardware and software modules of the processor. The software module may be disposed in a storage medium such as random access memory, flash memory, read-only memory, programmable read-only memory or electrically erasable programmable memory, registers, or the like. The storage medium is located in the memory 505, and the processor 504 reads information from the memory 505 and implements the contents of the above-described methods in combination with hardware thereof. In order to avoid repeated descriptions, detailed descriptions thereof are omitted herein.

While example embodiments have been shown and described above, it will be apparent to those skilled in the art that modifications and variations could be made without departing from the scope of the present disclosure as defined by the appended claims.

What is claimed is:

1. An apparatus for recording a video in a parked vehicle, the apparatus comprising:
    a processor; and
    a memory with instructions stored thereon, wherein the instructions, when executed by the processor, enable the apparatus to:
        detect an impact applied to the parked vehicle parked in a neutral state (N-state) parking mode, wherein, in the N-state parking mode, an engine is in an ignition-off state and a gear shift lever is in a neutral state,
        determine, based on an air pressure of a tire or a wavelength of a radar reception signal, whether the parked vehicle is moving, in response to detection of the impact, and
        record a video of surroundings of the parked vehicle, in response to a determination that the parked vehicle is moving, wherein when the parked vehicle moves forward or backward by an external force, shaking of the parked vehicle changes each of the air pressure of the tire and the wavelength of the radar reception signal.

2. The apparatus of claim 1, wherein the instructions, when executed by the processor, further enable the apparatus to, in response to detection of the impact, transmit a wake-up signal to a tire pressure monitor and to a radar configured to detect a passenger in the parked vehicle.

3. The apparatus of claim 2, wherein the instructions, when executed by the processor, further enable the apparatus to:
    periodically receive, from the tire pressure monitor, an amount of change in the air pressure based on the air pressure of the tire; and
    periodically receive, from the radar, an amount of change in the wavelength of the radar reception signal reflected and received from an inside of the parked vehicle.

4. The apparatus of claim 3, wherein the instructions, when executed by the processor, further enable the apparatus to:
    determine that the parked vehicle is moving when the amount of change in the air pressure of the tire received from the tire pressure monitor is greater than or equal to a preset first reference value or when the amount of change in the wavelength of the radar reception signal received from the radar module is greater than or equal to a preset second reference value.

5. The apparatus of claim 2, wherein:
    the tire pressure monitor is configured to measure the air pressure of the tire and to periodically transmit a first movement flag to the apparatus when an amount of change in the air pressure based on the air pressure of the tire is greater than or equal to a preset first reference value; and
    the radar is configured to transmit a radar transmission signal to an inside of the parked vehicle and to periodically transmit a second movement flag to the apparatus when an amount of change in the wavelength of the radar reception signal reflected and received from the inside of the parked vehicle is greater than or equal to a preset second reference value.

6. The apparatus of claim 5, wherein the instructions, when executed by the processor, further enable the apparatus to determine that the parked vehicle is moving in response to receiving the first movement flag or the second movement flag.

7. The apparatus of claim 1, wherein the instructions, when executed by the processor, further enable the apparatus to detect that the impact is applied to the parked vehicle, when an amount of the impact of the parked vehicle is greater than or equal to a preset value.

8. The apparatus of claim 1, wherein the instructions, when executed by the processor, further enable the apparatus to transmit, to an outside component, the video of the surroundings of the parked vehicle or a warning alarm.

9. A method for recording a video in a parked vehicle, the method comprising:
    detecting an impact applied to the parked vehicle parked in a neutral state (N-state) parking mode, wherein, in the N-state parking mode, an engine is in an ignition-off state and a gear shift lever is in a neutral state;
    determining, based on an air pressure of a tire or a wavelength of a radar reception signal, whether the parked vehicle is moving, in response to detection of the impact; and
    recording a video of surroundings of the parked vehicle, in response to a determination that the parked vehicle is moving, wherein the air pressure of the tire and the wavelength of the radar reception signal are changed by shaking of the parked vehicle, when the parked vehicle is moved forward or backward by an external force.

10. The method of claim 9, further comprising transmitting a wake-up signal to an air pressure measurement module for measuring the air pressure of the tire and to a radar module for detecting a passenger, in response to detecting the impact.

11. The method of claim 10, further comprising:
    measuring the air pressure of the tire and periodically transmitting an amount of change in the air pressure based on the air pressure of the tire; and
    transmitting a radar transmission signal to an inside of the parked vehicle and periodically transmitting an amount of change in the wavelength of the radar reception signal reflected and received from the inside of the parked vehicle.

12. The method of claim 11, wherein determining whether the parked vehicle is moving comprises determining that the parked vehicle is moving based on the amount of change in the air pressure of the tire being greater than or equal to a preset first reference value or the amount of change in the wavelength of the radar reception signal being greater than or equal to a preset second reference value.

13. The method of claim 10, further comprising:
    measuring the air pressure of the tire and periodically transmitting a first movement flag, when an amount of change in the air pressure based on the air pressure of the tire is greater than or equal to a preset first reference value; and transmitting a radar transmission signal to an inside of the parked vehicle and periodically transmitting a second movement flag, when an amount of change in the wavelength of the radar reception signal reflected and received from the inside of the parked vehicle is greater than or equal to a preset second reference value.

14. The method of claim 13, wherein determining whether the parked vehicle is moving comprises determining that the parked vehicle is moving in response to receiving the first movement flag or the second movement flag.

15. The method of claim 9, wherein detecting the impact comprises detecting that the impact is applied to the parked vehicle based on an amount of the impact being greater than or equal to a preset value.

16. The method of claim 9, further comprising transmitting, to an outside component, the video of the surroundings of the parked vehicle or a warning alarm.

17. A non-transitory computer-readable storage medium recording a program for causing a computer to perform the method of claim 9.

18. The apparatus of claim 2, further comprising the tire pressure monitor and the radar.

19. A system comprising:
a radar sensor;
a tire pressure monitor; and
a processor configured to:
  detect an impact applied to a parked vehicle parked in a neutral state (N-state) parking mode, wherein, in the N-state parking mode, an engine is in an ignition-off state and a gear shift lever is in a neutral state,
  determine, based on an air pressure of a tire measured by the tire pressure monitor or a wavelength of a radar reception signal measured by the radar sensor, whether the parked vehicle is moving, in response to detection of the impact, and
  record a video of surroundings of the parked vehicle, in response to a determination that the parked vehicle is moving, wherein when the parked vehicle moves forward or backward by an external force, shaking of the parked vehicle changes each of the air pressure of the tire and the wavelength of the radar reception signal.

20. The system of claim 19, wherein the processor is further configured to, in response to detection of the impact, activate the tire pressure monitor and the radar sensor.

* * * * *

UNITED STATES PATENT AND TRADEMARK OFFICE
CERTIFICATE OF CORRECTION

PATENT NO. : 12,167,164 B2  
APPLICATION NO. : 18/066033  
DATED : December 10, 2024  
INVENTOR(S) : Dong Cheol Jo Page 1 of 1

It is certified that error appears in the above-identified patent and that said Letters Patent is hereby corrected as shown below:

In the Claims

In Column 9, in Claim 4, Line 66, after "radar" delete "module".

Signed and Sealed this
Fourth Day of February, 2025

Coke Morgan Stewart
*Acting Director of the United States Patent and Trademark Office*